(12) United States Patent
Halliwell

(10) Patent No.: US 11,614,259 B2
(45) Date of Patent: Mar. 28, 2023

(54) GROUND HEAT EXCHANGER

(71) Applicant: HC Properties Inc, Clinton (CA)

(72) Inventor: John Martin Halliwell, Clinton (CA)

(73) Assignee: HC Properties Inc., Goderich (CA)

( * ) Notice: Subject to any disclaimer, the term of this patent is extended or adjusted under 35 U.S.C. 154(b) by 0 days.

(21) Appl. No.: 17/533,894

(22) Filed: Nov. 23, 2021

(65) Prior Publication Data

US 2022/0228778 A1 Jul. 21, 2022

Related U.S. Application Data

(60) Provisional application No. 63/139,026, filed on Jan. 19, 2021.

(51) Int. Cl.
*F24T 10/10* (2018.01)
*F03G 4/00* (2006.01)

(52) U.S. Cl.
CPC ............... *F24T 10/10* (2018.05); *F03G 4/00* (2021.08)

(58) Field of Classification Search
CPC ............. F24T 10/10; F03G 4/00; Y02E 10/10
USPC ............................................. 60/641.2–641.4
See application file for complete search history.

(56) References Cited

U.S. PATENT DOCUMENTS

| | | | | |
|---|---|---|---|---|
| 3,874,174 | A * | 4/1975 | Greene | F24T 10/20 165/45 |
| 3,986,362 | A * | 10/1976 | Baciu | F24T 10/30 60/659 |
| 4,512,155 | A * | 4/1985 | Sheinbaum | E21B 36/00 417/115 |
| 4,566,532 | A * | 1/1986 | Basmajian | F24T 10/30 165/45 |
| 9,587,890 | B2 * | 3/2017 | Yang | F28D 20/0034 |
| 9,708,885 | B2 * | 7/2017 | Loveday | E21B 33/146 |
| 2013/0232973 | A1 * | 9/2013 | McBay | F28D 15/00 165/45 |

* cited by examiner

*Primary Examiner* — Hoang M Nguyen
(74) *Attorney, Agent, or Firm* — Teitelbaum & Bouevitch; Neil Teitelbaum

(57) ABSTRACT

A geothermal system includes an outer vessel having a sidewall that is in contact with surrounding ground material. A geothermal pile is disposed within an interior volume of the outer vessel, wherein a first heat conducting liquid at least partially fills a space between an inner surface of the sidewall of the outer vessel and an outer surface of the geothermal pile when in an installed condition. A conduit disposed within an interior space of the geothermal pile conducts a second heat conducting liquid along a flow path within the geothermal pile toward a bottom end thereof and then back to an outlet at a top end thereof. During operation, heat is transferred from the surrounding ground to the second heat conducting liquid via the first heat conducting liquid within the space between the inner surface of the sidewall of the outer vessel and the outer surface of the geothermal pile.

12 Claims, 10 Drawing Sheets

GROUND HEAT EXCHANGER

CROSS-REFERENCE TO RELATED APPLICATIONS

This application claims priority from U.S. Provisional Patent Application No. 63/139,026, filed on Jan. 19, 2021 and from Canadian Patent Application No. 3,121,345 filed Jun. 7, 2021 and incorporated herein by reference in their entirety.

FIELD

This disclosure relates to a geothermal system of heat exchange and more particularly to a geothermal pile that is disposed in the ground inside a contained volume of water or another liquid.

BACKGROUND

Geothermal energy is said to be the second most abundant source of heat on Earth. It is the heat energy that is stored in the Earth and contained in rocks and metallic alloys, just below the outer surface of the Earth. The temperature of these rocks and metal alloys is at or near their melting points. Geothermal piles are often used to capture and bring above ground this heat stored below the ground. U.S. Pat. No. 10,655,892 to Kong et al. describes a geothermal heat transfer pipe embedded in a prefabricated pipe pile, sealed by closing the bottom thereof. U.S. Pat. No. 9,611,611 to Klekotka et al. describes the process of driving piles and the installation of piles into the ground for geothermal applications. U.S. Pat. No. 9,708,885 to Loveday et al., entitled System and Method for Extracting Energy, describes ways in which to better couple a pile with the walls of a surrounding borehole by injecting water into an annulus between the pile and the soil, to have the soil form a better thermal coupling with the pile after mixing with the injected water.

Geothermal piles are typically made of concrete or steel, having a wellhead at an upper end and having a U-shaped conduit within the center thereof for carrying a liquid such as water, alcohol, refrigerant, or a combination thereof. Although piles of this type perform a function, their ability to capture heat from the surrounding soil is somewhat limited and depends to some degree on the type of soil in which the pile is installed.

The presence of a groundwater table can facilitate heat transfer to and from the ground because thermal conductivities of water and soil are orders of magnitude higher than that of air. Thus, water-saturated soil is a more efficient medium for heat transfer than dry soil. Furthermore, having a greater surface area in which to collect the heat energy, and a medium to augment the transfer is advantageous.

It would be beneficial to provide an improved geothermal system for extracting heat energy from the ground.

SUMMARY OF EMBODIMENTS

It is well known that energy transfer in a medium such as water has a convective and a conductive component. Although other liquids may be used, in at least some embodiments described hereinafter water is selected as a suitable medium to transfer heat from the ground to a geothermal pile rather than directly coupling the geothermal pile to the surrounding ground. Water has the significant advantage of being present in the environment under natural conditions and does not cause any environmental concerns. As such, using water as an intermediary coupling medium offers numerous advantages—it is abundant, safe in the instance of a leak in the vessel, and it has adequate conductive properties.

An embodiment includes an in-ground vessel containing a liquid such as water, which forms an artificial water table, for collecting heat from the surrounding ground. A geothermal pipe or pile is disposed generally coaxially within the vessel for collecting heat from the ground-heated water contained within the vessel. The vessel containing the geothermal pipe or pile may have crushed gravel or another solid medium disposed therein to assist in securing the geothermal pipe or pile. In some embodiments the in-ground vessel is a steel pipe or tube having a closed bottom end. Alternatively, the steel pipe or tube of the in-ground vessel has an open bottom end that butts up against an impermeable ground layer, such as a rock layer, or is set in a concrete plug that serves to seal and anchor the bottom end of the pipe or tube. Further alternatively, the in-ground vessel is fabricated from another suitable material such as for instance concrete or plastic, etc.

In some embodiments, a geothermal system includes a pipe or pile disposed substantially coaxially within a vessel located at a depth within the ground, the pipe or pile containing a conduit for transporting a liquid from an inlet port to an outlet port through at least a portion of the pipe or pile in two directions (i.e., initially downward and then back upward). The vessel contains a liquid such as water in a region around the outside of the pipe or pile so that the liquid surrounds and contacts the pipe or pile. The outer surface area of the vessel is significantly greater than the outer surface area of the pipe or pile at same height, by virtue of having a larger diameter, and therefore contacts a larger area of the surrounding ground for extracting energy therefrom than would be the case if the pipe or pile was in direct contact with the surrounding ground.

In areas with dry or otherwise poor soil conditions a fill material may be added around the vessel and the water contained within the vessel may be controlled to overflow into the surrounding material to thereby create a region of improved thermal conductivity between the surrounding ground material and the sidewall of the vessel. The overflow of water may be a continuous flow, or the overflow of water may be actively controlled to maintain a desired moisture condition within the fill material.

A method for installing a geothermal system according to an embodiment may include boring a hole in the ground having depth of at least 25 feet (i.e., up to at least 50 feet or more) and having a first diameter $d_1$ of at least 40 inches (i.e., generally at least in the range 36-60 inches in diameter or more). An outer vessel is positioned of formed in the bored hole and having a second diameter $d_2$ conforming to the first diameter $d_1$ of the bore hole (i.e., a steel pipe or tube is inserted into the bore hole or concrete is poured to form a tube-shaped concrete vessel within the bore hole). A bottom end of the vessel is either sealed prior to being inserted into the bore hole or is arranged adjacent to a naturally or artificially occurring impermeable layer at the bottom end of the bore hole (i.e., abuts an impermeable rock layer or is set into a poured concrete plug). The vessel forms a container suitable for containing a heat conducting first liquid, such as for instance water. A geothermal pile is then arranged within the vessel, having third diameter $d_3$ smaller than the second diameter $d_2$. A region between the geothermal pile and inner wall of the vessel is filled with the heat conducting first liquid to a height so that at least a bottom portion of the geothermal pile is surrounded with the heat conducting first liquid. The geothermal pile has a conduit disposed therein for circulating a heat conducting second liquid into and out of the geothermal pile, the heat conducting first liquid being isolated from the heat conducting second liquid. In operation, heat is transferred between the ground surrounding the vessel and the heat conducting first liquid, and then subsequently between the heat conducting first liquid and the heat conducting second liquid through conduction.

In some embodiments, an upper portion of the borehole is formed with a diameter that is larger than the diameter $d_1$, and a layer of a fill material such as for instance sand and/or gravel is packed between the sidewall of the vessel and the surrounding ground material.

In accordance with an aspect of at least one embodiment, there is provided a geothermal system for extracting heat energy from the ground, comprising: an outer vessel having a diameter $d_2$, the outer vessel disposed within the ground and having a sidewall with an outer surface that is in contact with surrounding ground material when the geothermal system is in an installed condition, and the outer vessel having an inner surface defining an interior volume of the outer vessel; a geothermal pile having a diameter $d_3$ that is less than $d_2$ and being disposed within the interior volume when the geothermal system is in the installed condition; and a first heat conducting liquid at least partially filling a space that is defined between the inner surface of the sidewall of the outer vessel and an outer surface of the geothermal pile when the geothermal system is in the installed condition, wherein the geothermal pile comprises a conduit contained within an interior space thereof for conducting a second heat conducting liquid into the geothermal pile at a top end thereof and along a flow path within the geothermal pile toward a bottom end of the geothermal pile and then back to an outlet at the top end thereof, and wherein during operation heat is transferred from the surrounding ground to the second heat conducting liquid via the first heat conducting liquid within the that is defined space between the inner surface of the sidewall of the outer vessel and the outer surface of the geothermal pile.

In accordance with an aspect of at least one embodiment, there is provided a method of constructing a heat exchange system in the ground, comprising: providing a borehole in the ground having a first diameter $d_1$; providing an outer vessel, having a diameter $d_2$ less or equal to $d_1$, within the borehole; arranging a geothermal pile having an internal conduit extending along a length thereof within the outer vessel; at least partially filling a space between an inner sidewall surface of the outer vessel and an outer surface of the geothermal pile with a first heat conducting liquid; and coupling an inlet port and an outlet port of the conduit to a liquid circuit for a second heat conducting liquid.

In accordance with an aspect of at least one embodiment, there is provided a geothermal system for extracting heat energy from the ground, comprising: an outer vessel having a diameter $d_2$, the outer vessel disposed within the ground when in an installed condition and having a sidewall with an outer surface and with an inner surface, the inner surface defining an interior volume of the outer vessel; a geothermal pile having a diameter $d_3$ that is less than $d_2$ and being disposed within the interior volume when the geothermal system is in the installed condition; a volume of water filling a space between the inner surface of the sidewall of the outer vessel and an outer surface of the geothermal pile when the geothermal system is in the installed condition; a fill material packed around the outer surface of the outer vessel and extending to a depth $L_4$ below an open upper top of the outer vessel; and means for adding water to the volume of water such that, during use, a flow of water overflows the open upper top of the outer vessel and enters into the fill material; wherein the volume of water is a first heat conducting liquid and the geothermal pile comprises a conduit contained within an interior space thereof for conducting a second heat conducting liquid into the geothermal pile at a top end thereof and along a flow path within the geothermal pile toward a bottom end of the geothermal pile and then back to an outlet at the top end thereof, and wherein during operation heat is transferred from the surrounding ground to the sidewall of the outer vessel via the fill material.

BRIEF DESCRIPTION OF THE DRAWINGS

Exemplary embodiments will be described in accordance with the drawings, which are not drawn to scale, and in which.

DETAILED DESCRIPTION OF THE DRAWINGS

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Figure 1:
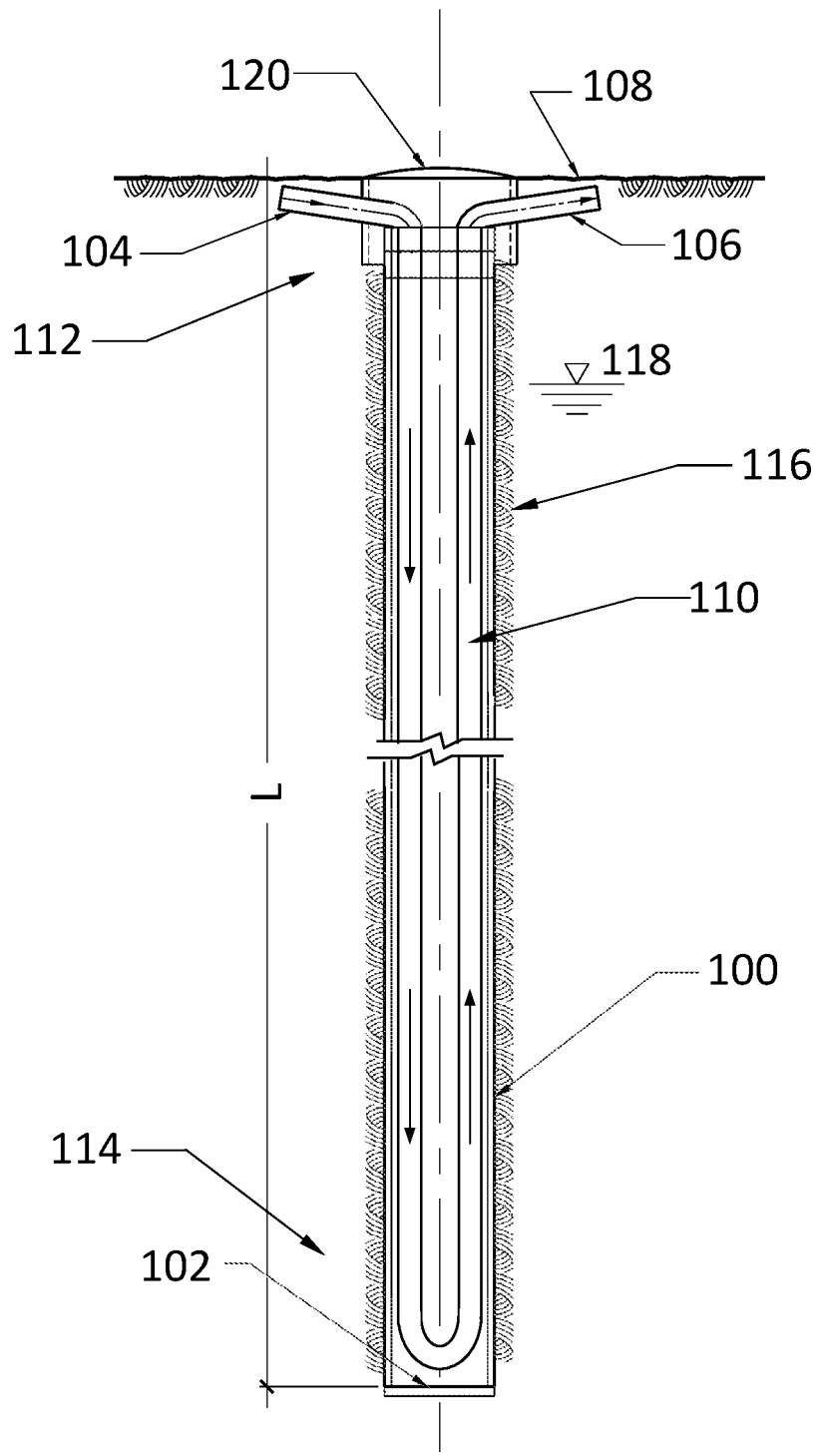
FIG. 1 is a simplified diagram of a prior art closed end geothermal heat exchange pile.

FIG. 1 is a simplified diagram showing a construction pile 100 adapted for use as a geothermal pile. The pile 100 has a closed end, e.g., a 25 mm base plate 102 is welded to the cylindrical sidewall of the pile 100. The pile 100 has a length L and is driven into the ground in known fashion. For instance, the length of the pile 100 is a standard 50 ft. length. Alternatively, the pile 100 may be any suitable length required for a specific application.

Pile 100 is adapted to have an inlet port 104 and an outlet port 106 approximately at or above grade 108. A continuous conduit 110 is disposed within the pile 100, which extends longitudinally from a top end 112 to near the bottom end 114 along a substantial portion of the length L of the geothermal energy pile 100. The conduit 110 may be coiled or U-shaped (as shown in FIG. 1) and provides a path (indicated by the arrows within the conduit 110) for liquid to flow from the top end 112 to the bottom end 114 of the pile 100 and then back up to the top end 114 and out through the outlet port 106. As the liquid moves along the path through the conduit 110 in the pile 100, heat is transferred into or out of the liquid from outside the conduit 110. In heating applications, this heat is collected from the surrounding ground 116, which has a high water table 118 as shown in FIG. 1. An access cover 120 optionally is provided to allow access for servicing, etc.

Figure 2:
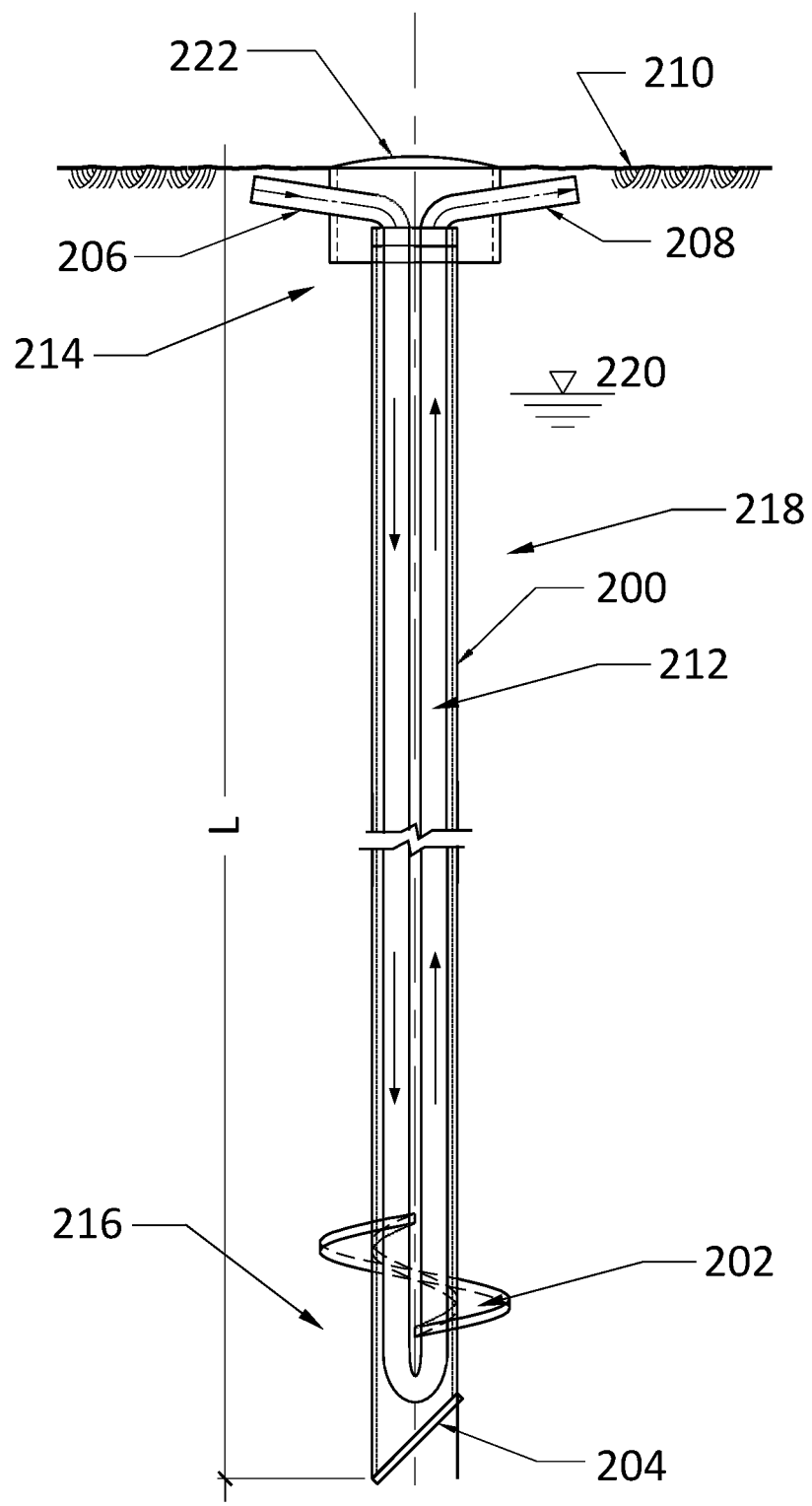
FIG. 2 is a simplified diagram of a prior art closed end geothermal heat exchange pile with helical flights.

FIG. 2 is a simplified diagram showing a helical construction pile 200 adapted for use as a geothermal pile. The pile 200 has a set of helical flights 202, which are used to advance the pile 200 into the ground when the pile 200 is rotated about its longitudinal axis. The pile 200 has an angled, closed bottom-end, e.g., a 25 mm base plate 204 is welded to the cylindrical sidewalls of the pile 200. The pile 200 has a length L and is screwed into the ground in known fashion. For instance, the length of the pile 200 is a standard 50 ft. length. Alternatively, the pile 200 may be any suitable length required for a specific application.

Pile 200 is adapted to have an inlet port 206 and an outlet port 208 approximately at or above grade 210. A continuous conduit 212 is disposed within the pile 200, which extends longitudinally from a top end 214 to near the bottom end 216 along a substantial portion of the length L of the geothermal energy pile 200. The conduit 212 may be coiled or U-shaped (as shown in FIG. 2) and provides a path (indicated by the arrows within the conduit 212) for liquid to flow from the top end 214 to the bottom end 216 of the pile 200 and then back up to the top end 214 and out through the outlet port 208. As the liquid moves along the path through the conduit 212 in the pile 200, heat is transferred into or out of the liquid from outside the conduit 212. In heating applications, this heat is collected from the surrounding ground 218, which has a high water table 220 as shown in FIG. 2. An access cover 222 optionally is provided to allow access for servicing, etc.

Figure 3:
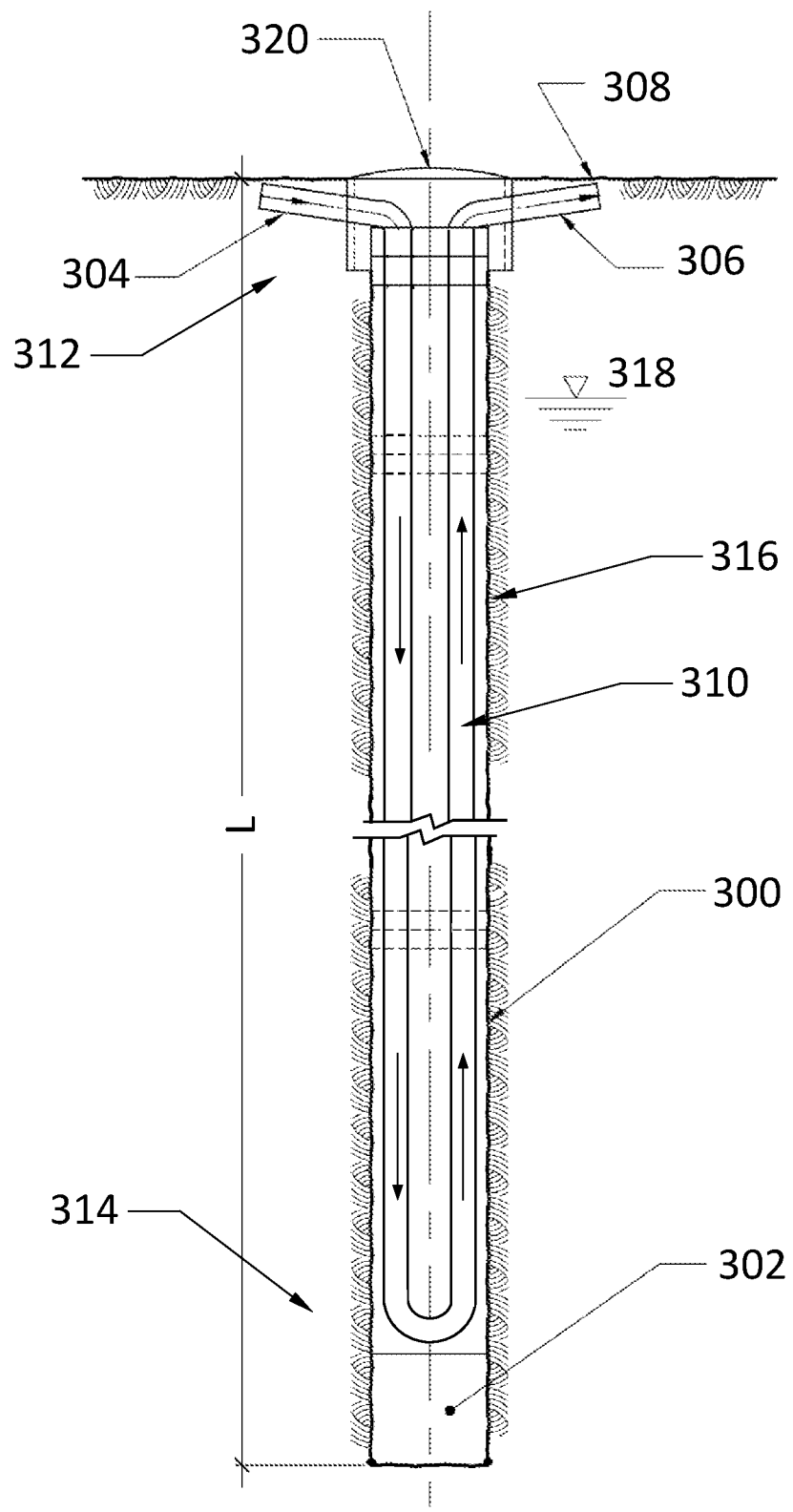
FIG. 3 is a simplified diagram of a prior art geothermal heat exchange pile having a grout sealed closed end.

FIG. 3 is a simplified diagram showing a construction pile 300 adapted for use as a geothermal pile. The pile 300 has a non-shrink grout seal 302 closing a bottom end thereof. The pile 300 has a length L, for instance a standard 50 ft. length. Alternatively, the pile 300 may be any suitable length required for a specific application.

Pile 300 is adapted to have an inlet port 304 and an outlet port 306 approximately at or above grade 308. A continuous conduit 310 is disposed within the pile 300, which extends longitudinally from a top end 312 to near the bottom end 314 along a substantial portion of the length L of the geothermal energy pile 300. The conduit 310 may be coiled or U-shaped (as shown in FIG. 2) and provides a path (indicated by the arrows within the conduit 310) for liquid to flow from the top end 312 to the bottom end 314 of the pile 300 and then back up to the top end 312 and out through the outlet port 306. As the liquid moves along the path through the conduit 310 in the pile 300, heat is transferred into or out of the liquid from outside the conduit 300. In heating applications, this heat is collected from the surrounding ground 316, which has a high water table 318 as shown in FIG. 3. An access cover 320 optionally is provided to allow access for servicing, etc.

Figure 4:
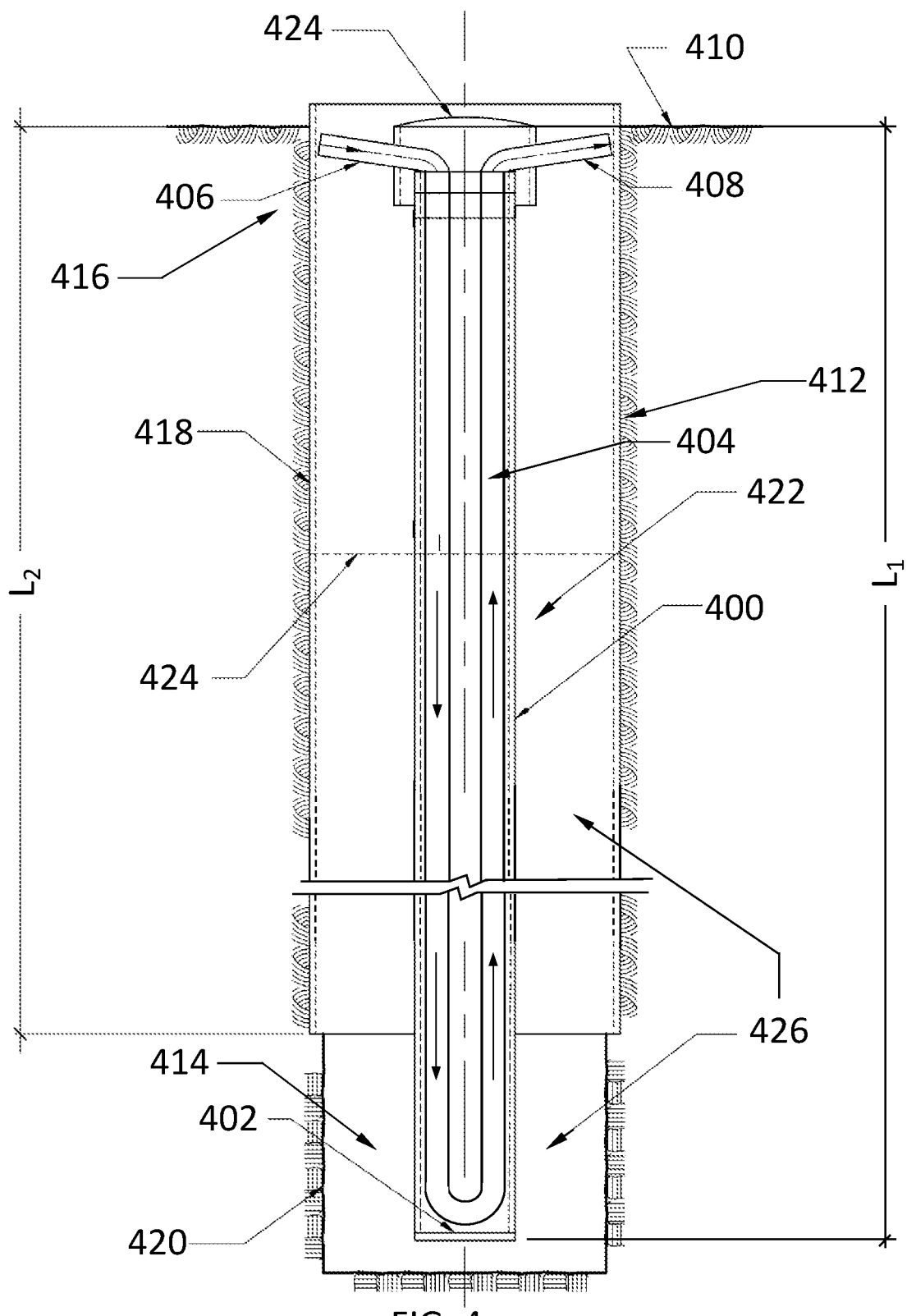
FIG. 4 is a simplified diagram of a co-axial geothermal heat exchanger in accordance with an embodiment.

Referring now to FIG. 4, a geothermal pile 400 has a closed end, e.g., a 19 mm end cap 402 is welded to the cylindrical sidewalls of the pile 400. Other means for closing the end of the geothermal pile 400 may be used. The geothermal pile 400 has a circular cross-section of e.g., diameter $d_3$ about 8 inches, but optionally the diameter $d_3$ may be greater than or less than 8 inches depending upon specific requirements. A conduit 404, having an inlet port 406 and an outlet port 408 both disposed approximately at or above grade 410, is arranged within the geothermal pile 400. The conduit 404 extends along a substantial portion of a length $L_1$ of the geothermal pile. The length $L_1$ may be any suitable length depending on specific requirements, for instance between about 25 feet and 50 feet. Alternatively, the length $L_1$ is less than 25 feet or greater than 50 feet, depending on specific requirements. The conduit 404 is preferably fabricated from a heat conducting material such as for instance copper, although plastic tubing or other suitable materials may be used with less effectiveness in transferring heat to or from a liquid within the conduit 404.

The description which follows refers to the capturing of heat from the ground 412 to the liquid within the conduit 404, however it should be understood that the reverse may occur if the ground 412 is cooler than the liquid flowing into the conduit 404 via the inlet port 406. Depending on the temperature difference, the geothermal system shown in FIG. 4 may be used for heating or cooling.

Geothermal energy pile 400 is shown disposed within and being substantially co-axial with a larger energy transfer pile 418, which is also referred to herein as an outer vessel, having circular cross-section with a diameter $d_2$ of e.g., 24 inches and a length $L_2$. The energy transfer pile 418 may have a closed bottom end (not shown in FIG. 4), or alternatively the energy transfer pile 418 may butt up against an impermeable subsurface layer, such as for instance a rock layer 420. The energy transfer pile 418 is shown to have a diameter $d_2$ approximately three times greater than the diameter $d_3$ of the energy pile 400, and the length $L_2$ in this example is less than the length $L_1$. Of course, other pile sizes may be used, such as for instance a pile 400 having a 16-inch diameter $d_3$ and a pile 418 having a 48-inch diameter $d_2$, etc. In addition, the lengths $L_1$ and $L_2$ may be substantially equal, or $L_2$ may be greater than $L_1$ etc. In general, both $L_1$ and $L_2$ are typically in the range of 25 feet to 50 feet, but lengths less than 25 feet or greater than 50 feet may be used depending on specific requirements.

A liquid, such as for instance water, is contained within an annular space 422 that is formed between an outer wall surface of the pile 400 and an inner wall surface of the energy transfer pile 418. The liquid preferably fills the annular space 422 to a height H that is sufficient to cover less than 75% of the length $L_1$ of the pile 400, however the liquid may fill the annular space 422 above this level and may even overflow the top of the energy transfer pile 418 into the surrounding ground 412. Thus, pile 418 acts as an outer vessel containing water and also contains the geothermal pile 400 in a generally central region thereof. The pile 418 is made of any suitable material, such as for instance sections of steel pipe or tube that are joined together along joints 424 (such as for instance by welding) and having a predetermined thickness selected to provide a required strength and longevity to withstand forces upon it. As will be apparent, the larger diameter pile 418 has a much greater outer surface area than the outer surface area of the centrally disposed geothermal pile 400. Since the surface area of a pile having a circular cross section is given by $\pi r^2 h$, the larger surface area of pile 418 is capable of collecting a significantly greater amount of energy from the soil 412 that is directly adjacent to it, compared to the amount of energy that could be collected by the smaller diameter pile 400 in the absence of the larger pile 418, due to the squared term $r^2$. For instance, a geothermal pile having a height of 10 feet and a radius of 1 foot has a surface area of 10 $\pi$ contacting the surrounding ground but a geothermal pile having the same height of 10 feet and a radius of 4 feet has a surface area of 160 $\pi$ contacting the surrounding ground. The water contained within the annular region 422 between the pile 418 and the geothermal pile 400, which may be referred to as an artificial water table, is in contact with the large surface area (steel) wall of the pile 418, and absorbs the ground heat from the soil 412 adjacent to the outer wall of the pile 418. The heat that is absorbed by the contained water is transferred, though conduction and convection, to the inner geothermal pile 400. The speed at which heat transfers by conduction and convection is considerably greater than the speed of heat transfer by conduction alone, and accordingly the efficiency of heat transfer between the surrounding ground and the inner geothermal pile 400 is improved in the system that is shown in FIG. 4.

As shown in FIG. 4, a material such as for instance one or more of sand, gravel or another solid medium may be placed within the annular space 422 between the geothermal pile 400 and the pile 418, to assist in securing the geothermal pile 400. In this embodiment, the liquid and the sand, gravel or other solid medium transfer the heat from the surrounding ground 412 to the conduit 404 within the geothermal pile 400. An access cover 424 optionally is provided to allow access for servicing, etc.

Figure 5:
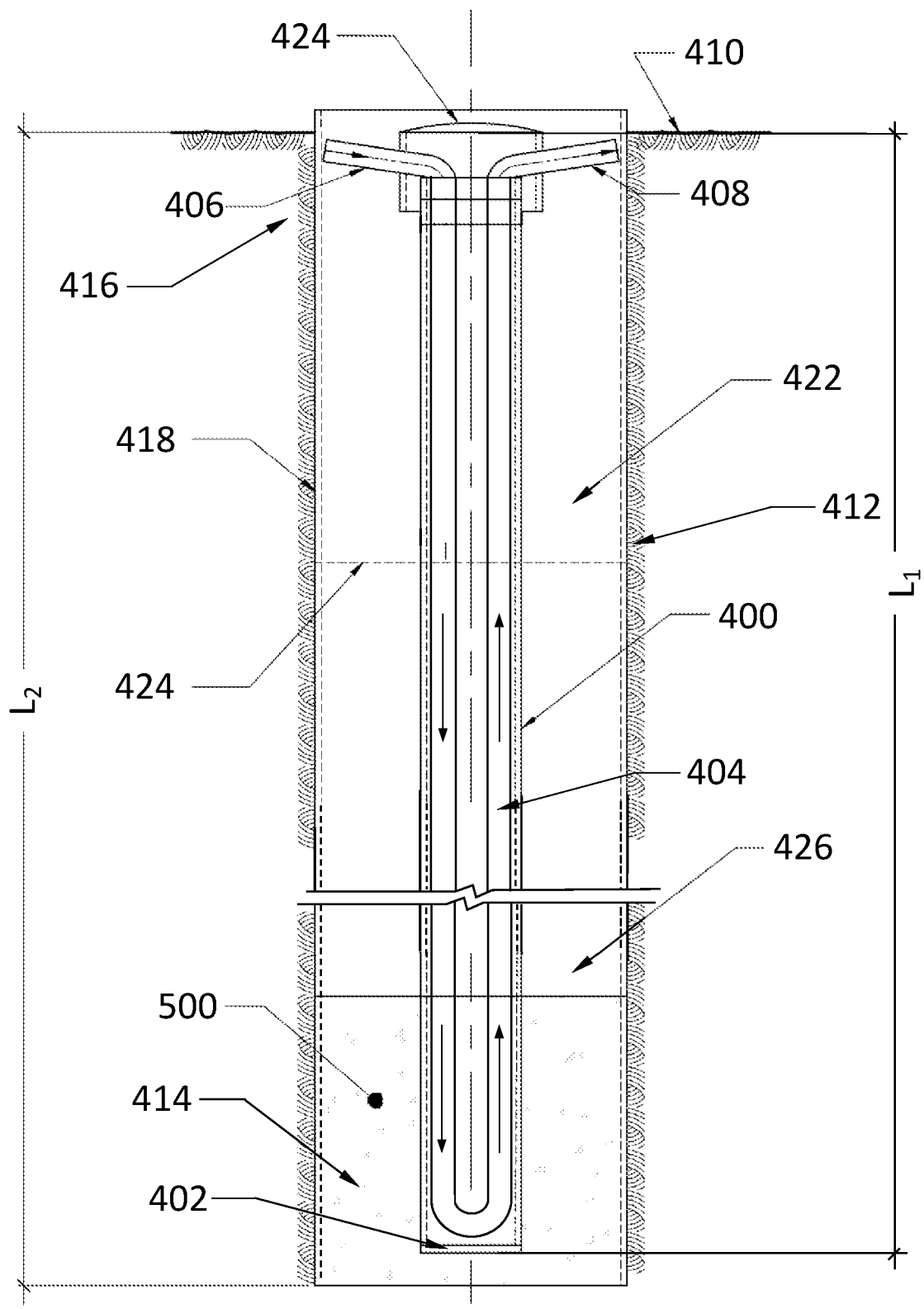
FIG. 5 is a simplified diagram of another co-axial geothermal heat exchanger in accordance with an embodiment.

Referring now to FIG. 5, shown is an alternative embodiment similar to the embodiment of FIG. 4, except a concrete plug 500 is formed at the bottom end of the outer vessel 418 and the bottom end of the geothermal pile 400 is embedded in the concrete plug 500. The concrete plug 500 effectively seals the bottom of the outer vessel 418 to facilitate containing the first heat conducting liquid therein.

Various alternative and/or optional embodiments in addition to those described with reference to FIGS. 4 and 5 may be envisaged. Some important variations are discussed in the following paragraphs, which apply equally to the embodiments shown in FIGS. 4 and 5.

In a not illustrated embodiment, an upper portion of the conduit 404 is insulated or double jacketed so that ground-heat that is collected at the lower portion of the pile 400 is not lost when the liquid in the conduit 404 travel upward toward the outlet port 408.

In a further not illustrated embodiment, the conduit 404 is made of a first length of a highly conductive material at its bottom end, which is the end closest to where the bottom end 414 of the pile 400 is located within the borehole, and is made of a second length of an insulating material at its top end, which is the end closest to where the top end 416 of the pile 400 is located within the borehole. In this way, the heat that is collected by the liquid at the bottom end of the conduit 404 is not lost along the return path toward the outlet port 408.

In another not illustrated embodiment, a circulating pump is provided to increase the turbulence and hence enhance the convective effect and speed of energy transfer through the water that is contained within the annular space 422 between the pile 418 and the pile 400.

In yet another not illustrated embodiment, a small rotating hub with radiating blades (i.e., an impeller) is disposed within the water near the bottom of the pile 418 to provide additional circulation and increase turbulence, so as to increase the rate of heat transfer.

In yet another not illustrated embodiment, the larger diameter energy transfer pile 418 may be significantly shorter in length that the geothermal cell or pile 400 placed therewithin. What is important is that the larger pile 418 or outer vessel be located at a depth in the ground where the most energy transfer will take place.

One or more of the various embodiments described above may further include a means to ensure that the outer vessel 418 contains a suitable amount of water. A simple sump pump (not shown) can be provided, which fills the outer vessel 418 if the amount of water therewithin is less than a predetermined amount.

In a not illustrated embodiment the water fills the space 422 between the inner surface of the sidewall of the outer vessel 418 and the outer surface of the geothermal pile 400 only to a height that is sufficient to cover less than ¾ of the length $L_1$ of the geothermal pile 400. What is important is that the water covers the geothermal pile at a depth in the ground where the most energy transfer will take place. In other embodiments the water may fill the space 422 between the inner surface of the sidewall of the outer vessel 418 and the outer surface of the geothermal pile 400 to a height that is sufficient to cover more than ¾ of the length $L_1$ of the geothermal pile 400. In some embodiments, the water may cover the entire length $L_1$ of the geothermal pile 400 and may even overflow the space 422 into the surrounding ground material 412.

In another embodiment, a flow control valve can be added to the bottom of the larger outer vessel 418 to allow pumped in water to flow into the outer vessel 418 slowly and/or in a controlled manner and/or to overflow over the annulus 422 to the surrounding soil 412 so as to have a better thermal contact between the surrounding soil 412 and the outer vessel 418. This flow preferably adds turbulence to the water within the outer vessel 418 in the anulus 422 which is advantages for convective heat transfer between the surrounding soil and the geothermal pile. This, and other related embodiments, is described in more detail below, with reference to FIGS. 7 to 10.

Figure 7:
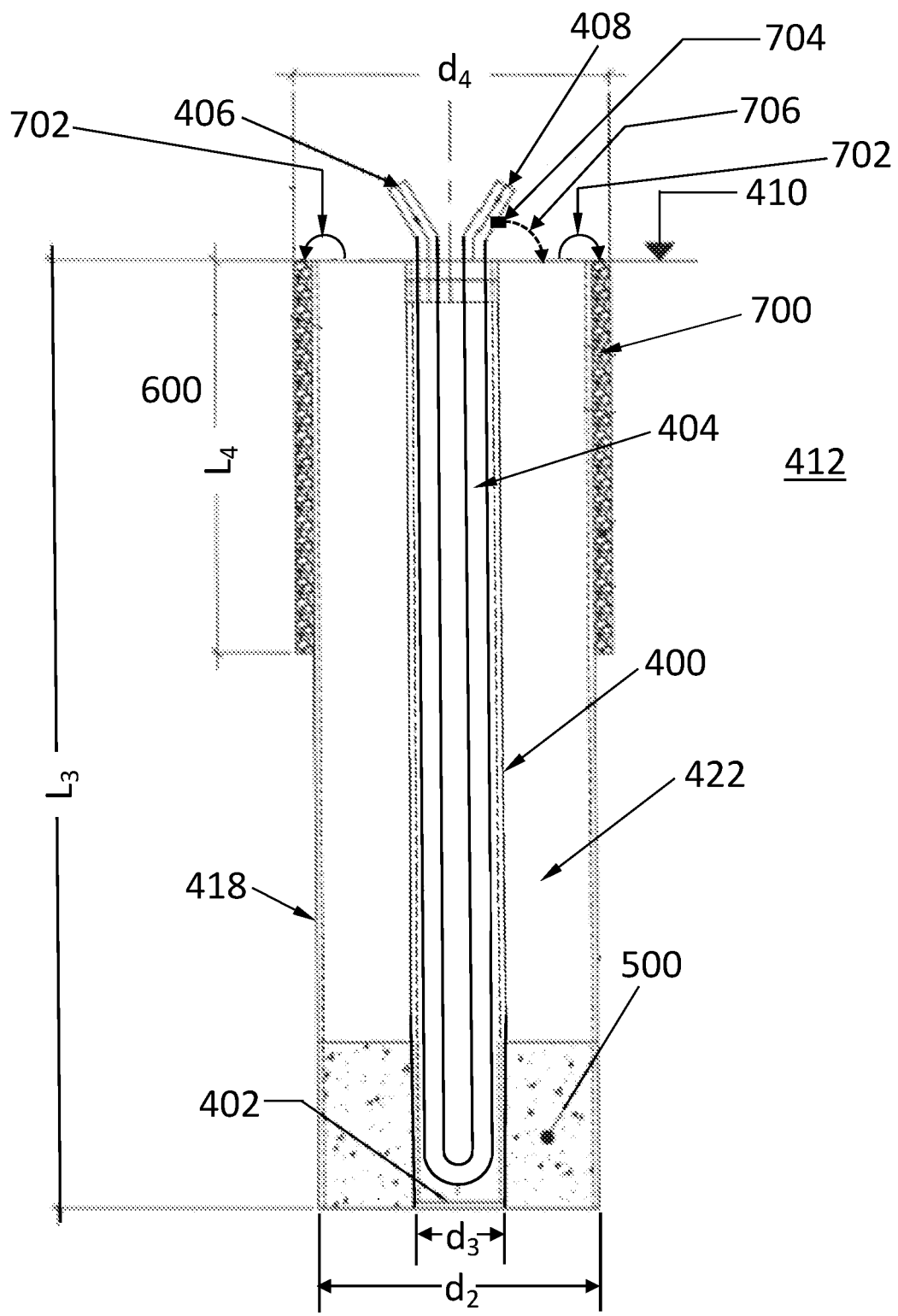
FIG. 7 is a simplified diagram of a geothermal heat exchanger in accordance with an embodiment.

Referring now to FIG. 7, a geothermal pile 400 has a closed end, e.g., a 19 mm end cap 402 is welded to the cylindrical sidewalls of the pile 400. Other means for closing the end of the geothermal pile 400 may be used. The geothermal pile 400 may have a circular cross-section of e.g., diameter $d_3$ about 16 inches, but optionally the diameter $d_3$ may be greater than or less than 16 inches depending upon specific requirements. A conduit 404, having an inlet port 406 and an outlet port 408, both disposed approximately at or above grade 410, is arranged within the geothermal pile 400. The conduit 404 extends along a substantial portion of a length $L_3$ of the geothermal pile. The length $L_3$ may be any suitable length depending on specific requirements, for instance between about 25 feet and about 50 feet. Alternatively, the length $L_3$ is less than 25 feet or greater than 50 feet, depending on specific requirements. The conduit 404 is preferably fabricated from a heat conducting material such as for instance copper, although plastic tubing or other suitable materials may be used with less effectiveness in transferring heat to or from a liquid within the conduit 404.

The description which follows refers to the capturing of heat from the ground 412 to the liquid within the conduit 404, however the reverse may occur if the ground 412 is cooler than the liquid flowing into the conduit 404 via the inlet port 406. Depending on the temperature difference, the geothermal system shown in FIG. 7 may be used for heating or cooling.

Geothermal energy pile 400 is shown disposed within and being substantially co-axial with a larger energy transfer pile 418, also referred to herein as an outer vessel, having a circular cross-section with a diameter $d_2$ of e.g., 48 inches. A concrete plug 500 is formed at the bottom end of the outer vessel 418 and the bottom end of the geothermal pile 400 is embedded in the concrete plug 500. The concrete plug 500 effectively seals the bottom of the outer vessel 418 to facilitate containing a first heat conducting liquid therein. Alternatively, the energy transfer pile 418 may have a closed bottom end (not shown in FIG. 7), or the energy transfer pile 418 may butt up against an impermeable subsurface layer, such as for instance a rock layer (not shown in FIG. 7).

A liquid, also referred to as the first heat conducting liquid, is contained within an annular space 422 that is formed between an outer wall surface of the pile 400 and an inner wall surface of the energy transfer pile 418. In the instant embodiment, the liquid is water. The liquid preferably completely fills the annular space 422 and overflows the top of the energy transfer pile 418 into a fill material 700 that surrounds the outer vessel 418. As shown in FIG. 7, the fill material 700 is disposed between an outer wall of the outer vessel 418 and the surrounding ground 412. In the example that is shown in FIG. 7, the fill material forms a ring around the outer wall of the outer vessel 418. The ring of fill material 700 may have an outer diameter $d_4$ of approximately 52 inches, thereby providing a layer of the fill material 700 having an approximately uniform thickness of about 2 inches. Of course, the thickness of the ring of fill material 700 may be greater than or less than 2 inches depending on specific requirements. The fill material 700 extends approximately from the existing grade 410 to a depth $L_4$, such as for instance about 10 feet. Of course, the fill material 700 may extend to a greater or lesser depth below the existing grade 410 depending on specific requirements. The fill material is for instance an aggregate material that includes sand, gravel, or a combination thereof, such that water entering the top of the fill material percolates downward therethrough under the influence of gravity.

The energy transfer pile 418 acts as an outer vessel containing the water, and also contains the geothermal pile 400 in a generally central region thereof. The energy transfer pile 418 is made of any suitable material, such as for instance sections of steel pipe or tube that are joined together along joints (such as for instance by welding) and having a predetermined thickness selected to provide a required strength and longevity to withstand forces acting upon it. The top end of the energy transfer pile 418 is open. In this context, the term "open" is intended to mean that water can escape from the annular space 422 into the fill material 700. An open-top energy transfer pile 418 may be uncovered, in which case water simply flows over the rim at the top end of the pile 418 (as shown e.g., in FIG. 7), or the top end may be covered, and slots or perforations may be formed in the sidewall of the pile 418 proximate the covered top end to allow water to flow out. In either case, what is important is that the water level within the annular space 422 is close to or level with the top of the pile 418 and there is a route for the contained water to escape into the surrounding fill material 700 substantially continuously around the circumference of the pile 418.

As will be apparent, the larger diameter pile 418 has a much greater outer surface area than the outer surface area of the centrally disposed geothermal pile 400. Since the surface area of a pile having a circular cross section is given by $\pi r^2 h$, the larger surface area of pile 418 can collect a significantly greater amount of energy from the surrounding ground 412, compared to the amount of energy that could be collected by the smaller diameter pile 400 in the absence of the larger pile 418, due to the squared term $r^2$. For instance, a geothermal pile having a height of 10 feet and a radius of 1 foot has a surface area of $10\,\pi$ contacting the surrounding ground but a geothermal pile having the same height of 10 feet and a radius of 4 feet has a surface area of $160\,\pi$ contacting the surrounding ground. The water contained within the annular region 422 between the pile 418 and the geothermal pile 400, which may be referred to as an artificial water table, is in contact with the large surface area (steel) wall of the pile 418, and absorbs the ground heat from the soil 412. The heat that is absorbed by the contained water is transferred, though conduction and convection, to the inner geothermal pile 400. The speed at which heat transfers by conduction and convection is considerably greater than the speed of heat transfer by conduction alone, and accordingly the efficiency of heat transfer between the surrounding ground 412 and the inner geothermal pile 400 is improved in the system that is shown in FIG. 7.

To enhance the efficiency of heat transfer between the surrounding ground 412 and the inner geothermal pile 400, the system as shown in FIG. 7 includes means for overflowing a volume of liquid 702 from the annular space 422 into the fill material 700. This embodiment is particularly advantageous in areas in which the soil is very dry or is otherwise poorly suited for transferring heat to the geothermal pile 400 within the outer vessel 418. For instance, the overflowed liquid, typically water, percolates downward through the fill material, which may include sand and/or gravel, and thereby increases the thermal conductivity adjacent to the sidewall of the outer vessel 418 and increases the efficiency of heat transfer.

In the example that is shown in FIG. 7, a valve 704 is provided in the outlet line 408. When water is used as the fluid that is pumped through the conduit 404, a small amount may be bled out through the valve 704 (shown using a dashed line) into the annular space 422. Using the overflowed liquid 702 (i.e., water) to keep the fill material 700 damp increases the thermal transfer capacity of the fill material 700 compared to the dry fill material. Preferably, the valve 704 is adjustable to allow the amount of water 706 that is added from the outlet line 408 into the annular space 422 to be controllably varied. In this way, the amount of overflowed water 702 can be controlled to suit different soil types, etc. The valve 704 may be adjustable in a manual and/or automatic fashion. In one aspect, the valve 704 may be adjusted manually based on visual and/or other observations of the condition of the fill material 700. For instance, if the fill material 700 appears to be dry then the valve 704 may be opened wider to increase the flow of water 706 into the annular space and thereby cause more water to overflow 702 into the fill material 700. Alternatively, if the fill material 700 appears to be submerged in water, then the valve 704 may be partially or fully closed. In another aspect, the valve 704 may be adjusted automatically using a suitably configured electronic controller, as discussed in more detail below, either based on a timer or based on feedback from sensors that are arranged around and or within the outer vessel 418.

Figure 8:
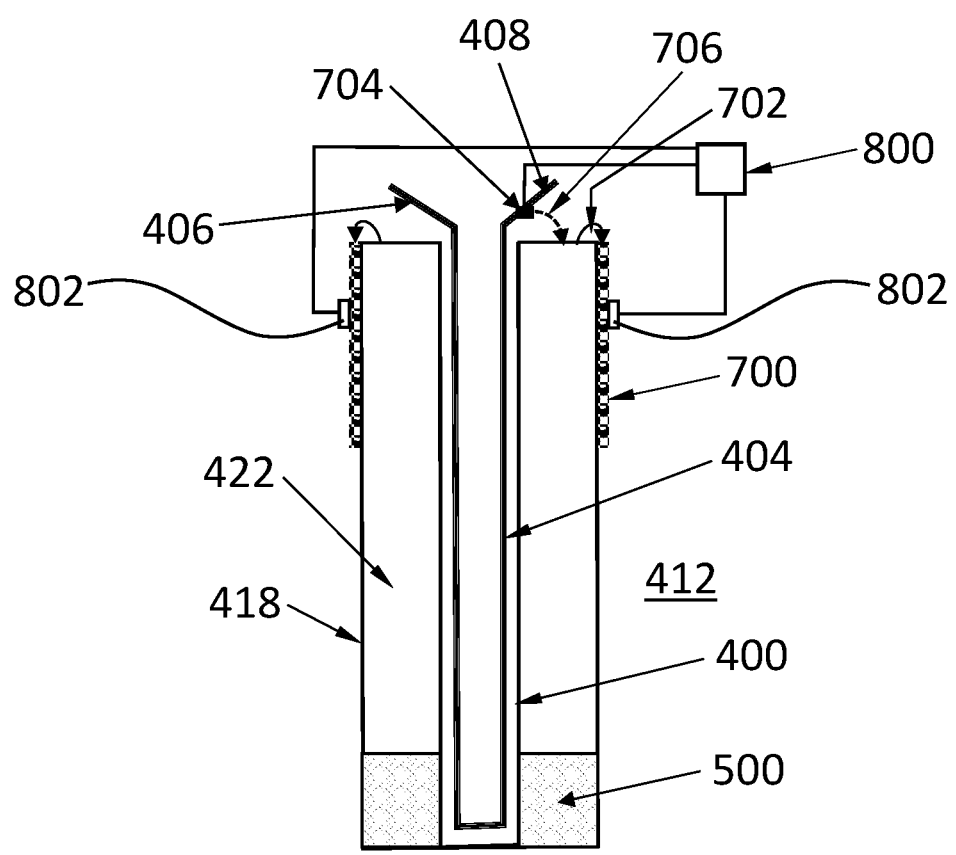
FIG. 8 is a simplified diagram of a geothermal heat exchanger system including a controller and sensors in accordance with an embodiment.

Referring now to FIG. 8, shown is a more simplified illustration of the system of FIG. 7 and further including a control arrangement for varying the flow of water 706 into the annular space 422 via valve 704 in the outlet line 408. An electronic controller 800 is provided in operative communication with at least one sensor 802, but in this specific example a plurality of sensors 802 is arranged around the outer vessel 418. The sensors 802 sense e.g., moisture content of the fill material 700 and provide a signal relating to the sensed moisture content to the controller 800. The controller 800 actuates the valve 704 in dependence upon the received signals. For instance, when the received signals are indicative of a fill material moisture content that is below a predetermined range the controller 800 opens the valve 704 to increase the flow of water 706 into the annular space 422, and thereby increase the overflow of fluid 702 into the fill material 700. After a time, the controller 800 closes either partially or fully the valve 704 in response to received signals that are indicative of a fill material moisture content within the predetermined range.

Figure 9:
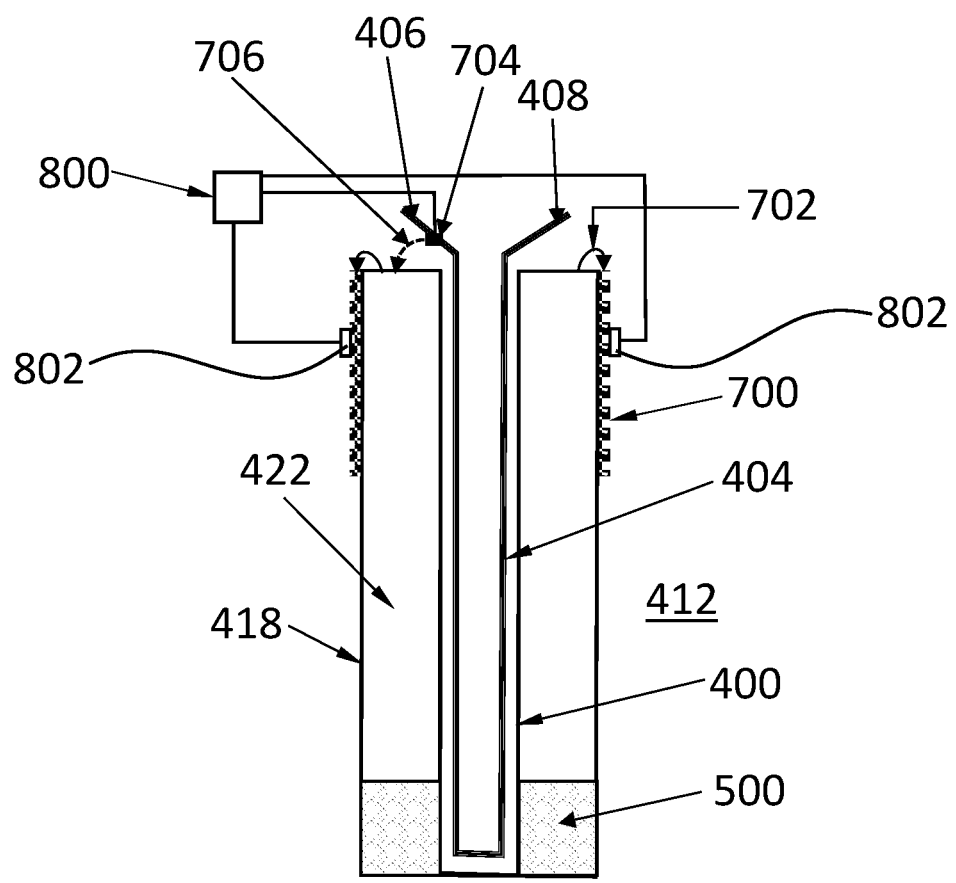
FIG. 9 is a simplified diagram of a geothermal heat exchanger system including a controller and sensors in accordance with an embodiment.

The system that is shown in FIG. 9 is substantially the same as the system shown in FIG. 8, except the valve 704 is provided in the inlet line 406. In this case, the flow of water 706 is bled out through valve 704 into the annular space 422 prior to being heated within the conduit 404. The system of FIG. 9 is suitable for warmer climate in which ice formation near the grade level is not a major concern, and advantageously does not result in the loss of warmed water. Optionally, a valve 704 is provided in both the inlet line 406 and the outlet line 408 and the controller controls operation of one or both valves 704 depending on other factors including ambient temperature, sensed formation of ice within fill material 700 etc.

Figure 10:
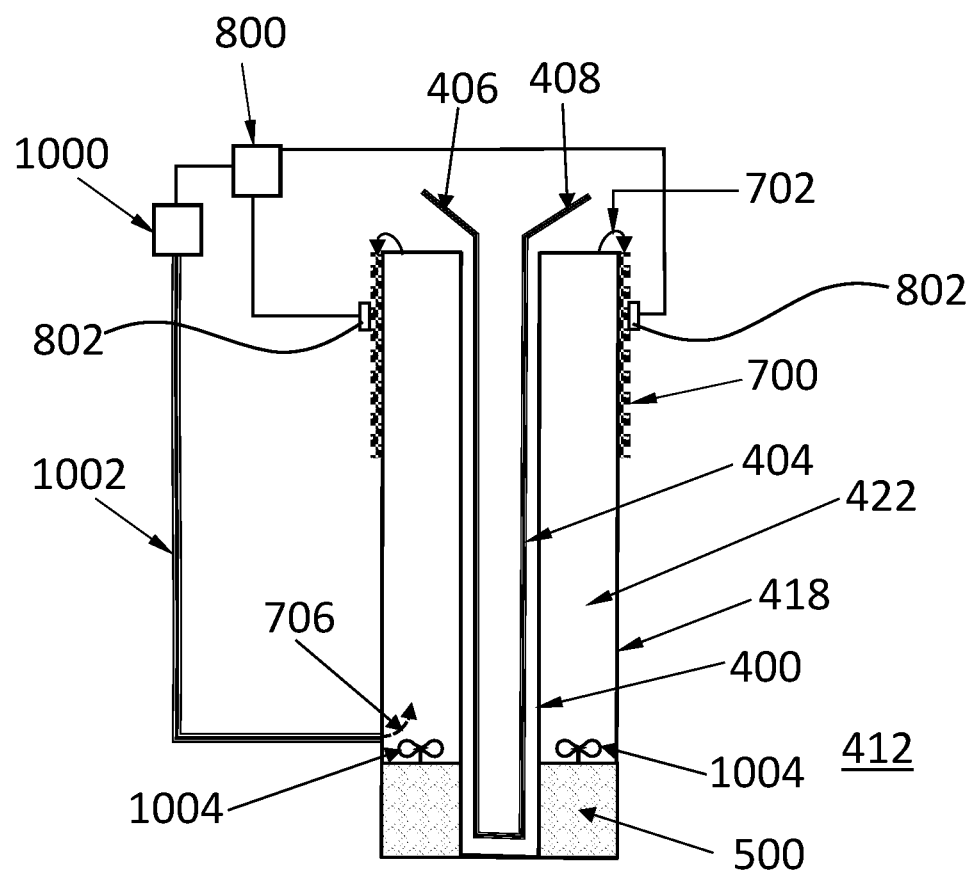
FIG. 10 is a simplified diagram of a geothermal heat exchanger system including a controller and sensors in accordance with an embodiment.

Referring now to FIG. 10, shown is a simplified illustration of another system and a control arrangement for varying the flow of water 706 into the annular space 422 via a source of water 1000 that is external to the conduit 404. In FIG. 10, the flow of water 706 is introduced near the bottom of the annular space 422 via a separate conduit 1002. Optionally, the flow of water 706 is introduced at a different height along the outer vessel 418. Further optionally, the flow of water 706 is introduced at a plurality of different heights along the outer vessel 418 and/or at different circumferentially spaced locations around the outer vessel 418. FIG. 10 also shows a small rotating hub with radiating blades (i.e., an impeller 1004) disposed within the water near the bottom of the outer vessel 418, which provides additional circulation and increase turbulence, so as to increase the rate of heat transfer. The impeller 1004 or another suitable device may be used in any of the other embodiments that have been described above.

The system that is shown in FIG. 10 functions similar to the systems that have already been described with reference to FIGS. 8 and 9. The controller 800 is provided in operative communication with at least one sensor, in this specific example a plurality of sensors 802 is arranged around the outer vessel 418. The sensors 802 sense e.g., moisture content of the fill material 700 and provide a signal relating to the sensed moisture content to the controller 800. The controller actuates the external source of water 1000, e.g., opens or closes a valve of the source 1000, in dependence upon the received signals. For instance, when the received signals are indicative of a fill material moisture content that is below a predetermined range the controller 800 controls the source 1000 to increase the flow of water 706 into the annular space 422, and thereby increase the overflow of water 702 into the fill material 700. After a time, the controller 800 controls the source 1000 to provide a reduced flow of water 706, or now flow, in response to received signals that are indicative of a fill material moisture content within the predetermined range.

Although the embodiments described heretofore have shown the liquid disposed between the inner geothermal cell and the outer pile to be water, other liquids can be used. In addition, although the embodiments described heretofore describe and illustrate providing a borehole, disposing a large diameter pile having a closed end (or an open end butted up against an impermeable layer) in the borehole, placing a geothermal pile within the large diameter pile, and filling the annulus between the two piles with an energy conducting liquid such as water, other embodiments may be envisaged. For example, a geothermal cell, which is not in the form of a pile, but is a conduit which directs a liquid into and out of the geothermal cell, may be disposed in the center of the large diameter pile.

The geothermal heat exchange systems described with reference to FIGS. 4 and 5 may be constructed according to the following method. A bore borehole is formed in the ground having a first diameter $d_1$. Known techniques, appropriate for the ground type within which the installation is occurring may be used to form the borehole. An outer vessel, having a diameter $d_2$ that is less than or substantially equal to $d_1$, is inserted into the borehole. The outer vessel may be formed using a single length of pipe or tubing formed of a suitable metal or metal alloy, or by arranging a series of shorter lengths of pipe or tubing in a stacked arrangement with joints (sealed or unsealed) between adjacent lengths, or by pouring a concrete liner having a generally circular cross section with an internal diameter $d_2$. A geothermal pile having an internal conduit extending along a length thereof is arranged generally centrally and coaxially within the outer vessel. The diameter $d_3$ of the geothermal pile is less than $d_2$, preferably $d_3$ is about ⅓ $d_2$. The generally annular space between an inner sidewall surface of the outer vessel and an outer surface of the geothermal pile is at least partially filled with a first heat conducting liquid, such as for instance water. An inlet port and an outlet port of the conduit within the geothermal pile is connected to a liquid circuit for a second heat conducting liquid. The liquid circuit e.g., collects the heated second heat conducting liquid from a plurality of geothermal piles, and provides the heated liquid to one or more points of use, such as for instance a building heating system.

In the case of the geothermal heat exchange systems described with reference to FIGS. 7 to 10, the construction method is substantially similar however the borehole is formed with the enlarged diameter $d_4$ to the depth $L_4$, and the fill material 700 is added after the outer vessel 418 is in place. The additional control/sensor arrangements and/or conduit for the external water supply are installed at appropriate and convenient points of the construction, with final connections and fittings preferably being made after placement of the fill material 700 and not-illustrated external infrastructure, if any, has been completed. Although not shown explicitly in FIGS. 7 to 10, the space between the inner wall of the outer vessel 418 and the outer surface of the geothermal pile 400 may be partially filled with sand and/or gravel, as discussed below e.g., with reference to FIG. 6.

Figure 6:
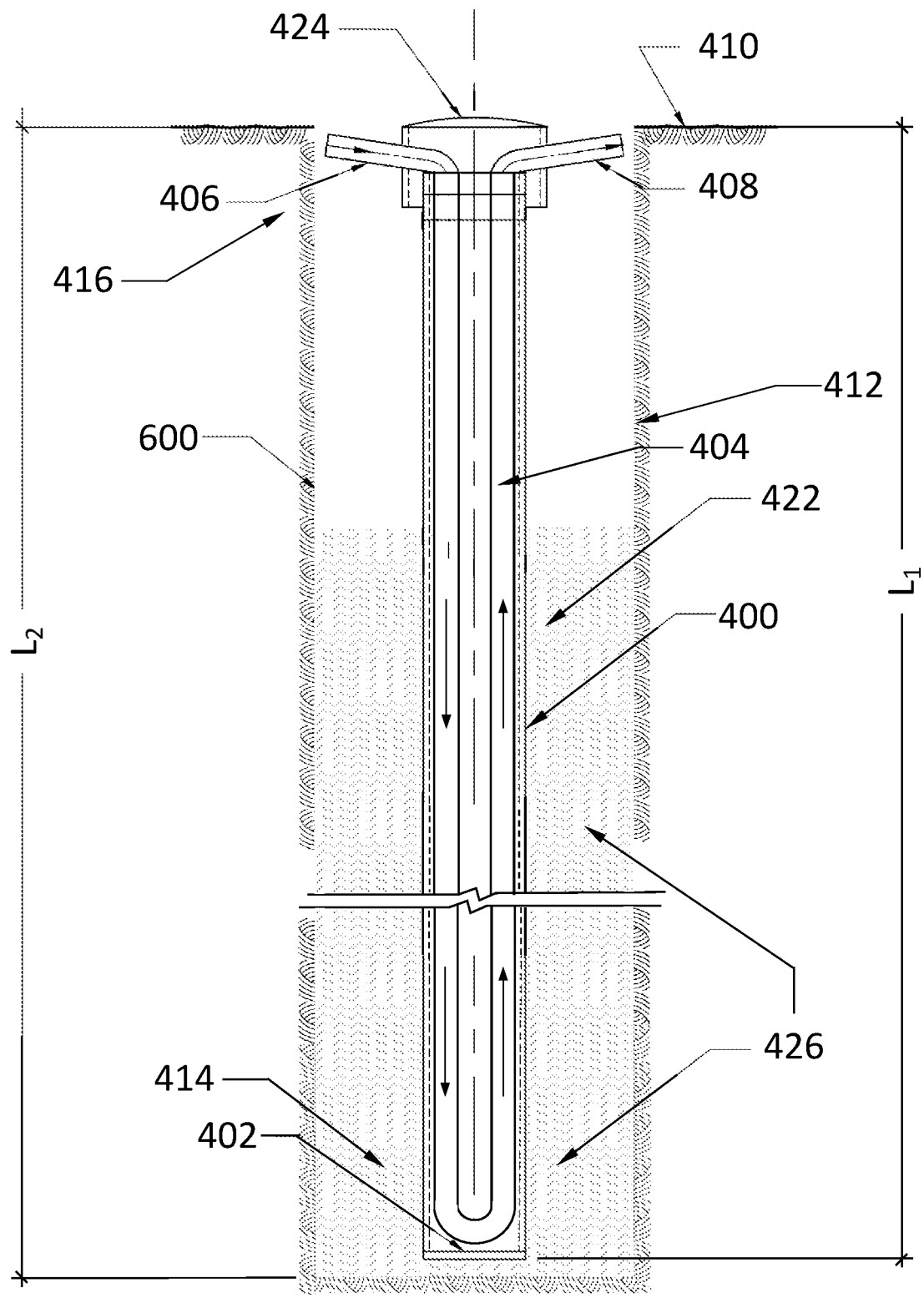
FIG. 6 is a simplified diagram of a geothermal heat exchanger in accordance with an embodiment.

Referring now to FIG. 6, shown is a geothermal heat exchanger similar to the ones that are shown in FIGS. 4 and 5, but without a separate outer vessel for containing a volume of water. The configuration that is shown in FIG. 6 may be employed e.g., when the ground material 412 is stable and substantially impermeable to water, such that the inner wall 600 of the bore hole in the ground performs the roll of containing the volume of water. For instance, the bore hole may be formed into ground material 412 such as clay or rock, etc. to a depth $L_2$, and geothermal pile 400 having length $L_1 < L_2$ may be arranged substantially centrally within the borehole. A material 426 such as for instance sand and/or gravel or another suitable material may be added into the annular space 422 between the inner wall 600 and the outer surface of the geothermal pile 400, to a height that is sufficient to cover at least the lower portion of the geothermal pile 400 so as to secure the geothermal pile 400 in its desired position within the borehole. The generally annular space 422 is also at least partially filled with a first heat conducting liquid, such as for instance water. An inlet port and an outlet port of the conduit within the geothermal pile 400 is connected to a liquid circuit for a second heat conducting liquid. The liquid circuit e.g., collects the heated second heat conducting liquid from a plurality of geothermal piles 400, and provides the heated liquid to one or more points of use, such as for instance a building heating system.

In the specific embodiments that are described above with reference to FIGS. 4-10, the diameter $d_2$ of the outer vessel 418 is approximately 3 times the diameter $d_3$ of the geothermal pile 400. In this way, the annular space 422 between the inner surface of the sidewall of the outer vessel 418 and the outer surface of the geothermal pile 400 has a width that is approximately equal to $d_3$, which extends circumferentially around between the concentrically arranged piles. In general, the annular space is dimensioned to contain a volume of water that is suitable for transferring heat extracted from the surrounding ground 412 to the geothermal pile, and the width of the annular space 422 may be selected to suit the requirements for different sites. Preferably, $d_2$ is at least 1.5 times $d_3$, or $d_2$ is at least 2 times $d_3$, or $d_2$ is at least 3 times $d_3$ as shown in the embodiments disclosed herein. Of course, optionally $d_2$ may be more than 3 times $d_3$ is the requirements of a particular site necessitate the use of a larger volume of water within the annular space 422.

Throughout the description and claims of this specification, the words "comprise", "including", "having" and "contain" and variations of the words, for example "comprising" and "comprises" etc., mean "including but not limited to", and are not intended to, and do not exclude other components.

It will be appreciated that variations to the foregoing embodiments of the disclosure can be made while still falling within the scope of the disclosure. Each feature disclosed in this specification, unless stated otherwise, may be replaced by alternative features serving the same, equivalent or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the disclosure are applicable to all aspects of the disclosure and may be used in any combination. Likewise, features described in non-essential combinations may be used separately (not in combination).

What is claimed is:

1. A geothermal system for extracting heat energy from the ground, comprising:
    an outer vessel having a diameter $d_2$, the outer vessel disposed within the ground when in an installed condition and having a sidewall with an outer surface and with an inner surface, the inner surface defining an interior volume of the outer vessel;
    a geothermal pile having a diameter $d_3$ that is less than $d_2$ and being disposed within the interior volume when the geothermal system is in the installed condition;
    a volume of water filling a space between the inner surface of the sidewall of the outer vessel and an outer surface of the geothermal pile when the geothermal system is in the installed condition;
    a fill material packed around the outer surface of the outer vessel and extending to a depth $L_4$ below an open upper top of the outer vessel; and
    means for adding water to the volume of water such that, during use, a flow of water overflows the open upper top of the outer vessel and enters into the fill material;
    wherein the volume of water is a first heat conducting liquid and the geothermal pile comprises a conduit contained within an interior space thereof for conducting a second heat conducting liquid into the geothermal pile at a top end thereof and along a flow path within the geothermal pile toward a bottom end of the geothermal pile and then back to an outlet at the top end thereof, and wherein during operation heat is transferred from the surrounding ground to the sidewall of the outer vessel via the fill material.

2. The geothermal system of claim 1, wherein the fill material is an aggregate material comprising at least one of gravel and sand.

3. The geothermal system of claim 2, wherein the second heat conducting liquid is water and the means for adding water comprises a valve disposed within the conduit.

4. The geothermal system of claim 2, wherein the second heat conducting liquid is water and the means for adding water comprises a valve disposed within an inlet of the conduit or the outlet of the conduit.

5. The geothermal system of claim 2, wherein the means for adding water comprises an external source of water that is separate from the second heat conducting liquid within the conduit, and further comprising a valve disposed between the external source of water and the space that is defined between the inner surface of the sidewall of the outer vessel and the outer surface of the geothermal pile.

6. The geothermal system of claim 2, wherein the means for adding water comprises:
    an adjustable valve for controllably varying a rate of addition of the added water into the space that is defined between the inner surface of the sidewall of the outer vessel and the outer surface of the geothermal pile; and
    an electronic controller in communication with the adjustable valve, the electronic controller for automatically adjusting the adjustable valve for controllably varying a rate of addition of the added water.

7. The geothermal system of claim 6, further comprising at least one sensor for sensing a moisture content of the fill material and for providing a signal to the electronic controller relating to the sensed moisture content, wherein the controller is responsive to the provided signal for controllably adjusting the adjustable valve.

8. The geothermal system of claim 2, wherein the outer vessel extends to a depth $L_3$ that is between about 25 and about 50 feet below surface grade level, wherein $L_4$ is at least 10 feet, and wherein the fill material forms an annular layer that is at least 2 inches thick around the outer vessel.

9. The geothermal system of claim 2, wherein the means for adding water comprises a flow control valve for controlling a pumped flow of water into the space that is defined between the inner surface of the sidewall of the outer vessel and the outer surface of the geothermal pile.

10. The geothermal system of claim 1, further comprising a circulating pump or an impeller arranged to increase turbulence of the water within the space that is defined between the inner surface of the sidewall of the outer vessel and the outer surface of the geothermal pile.

11. The geothermal system of claim 1, wherein $d_2$ is between 1.5 and 3 times $d_3$.

12. The geothermal system of claim 1, wherein $d_2$ is at least 3 times $d_3$.

\* \* \* \* \*